United States Patent [19]

Anderson

[11] 4,381,123
[45] Apr. 26, 1983

[54] PICKUP TRUCK BED SIDEWALL ADAPTOR FOR A STAKE-FRAME ASSEMBLY

[76] Inventor: Byron D. Anderson, 9395 Harritt Rd., Sp. 246, Lakeside, Calif. 92040

[21] Appl. No.: 223,828

[22] Filed: Jan. 9, 1981

[51] Int. Cl.³ .................................................. B60P 7/06
[52] U.S. Cl. ...................................... 296/43; 403/234; 403/237
[58] Field of Search ................ 296/43, 3; 403/237, 403/234, 235, 191; 248/214

[56] References Cited

U.S. PATENT DOCUMENTS

| | | | |
|---|---|---|---|
| 3,460,864 | 8/1969 | Piercy | 296/43 |
| 3,765,713 | 10/1973 | Suitt | 296/3 |
| 4,211,448 | 7/1980 | Weston | 296/3 |
| 4,253,224 | 3/1981 | Hickman | 403/237 |

*Primary Examiner*—Robert R. Song
*Attorney, Agent, or Firm*—Charles C. Logan, II

[57] ABSTRACT

A pickup truck bed sidewall adaptor for a stake-frame assembly comprised of a pickup truck sidewall coupling member and a telescoping member. The coupling member has a top wall portion that in its operational position matingly rests on the horizontal top wall portion of the pickup truck bed sidewall. The top wall portion has a downwardly extending inside wall portion that matingly contacts the inside surface of the upper region of the pickup truck bed sidewall. The top wall portion also has a downwardly extending flange portion that matingly contacts the outside surface of a flange extending downwardly from the outer edge of the horizontal top wall portion of the pickup truck bed sidewall. The downwardly extending flange portion has an inwardly extending lip portion connected at its lower end that functions to grip the bottom edge of the downwardly extending outside flange of the pickup truck bed sidewall. The telescoping member is substantially vertically oriented and it extends upwardly from the top surface of the top wall portion. The coupling member and the telescoping member are integrally formed from a flexible plastic material.

8 Claims, 6 Drawing Figures

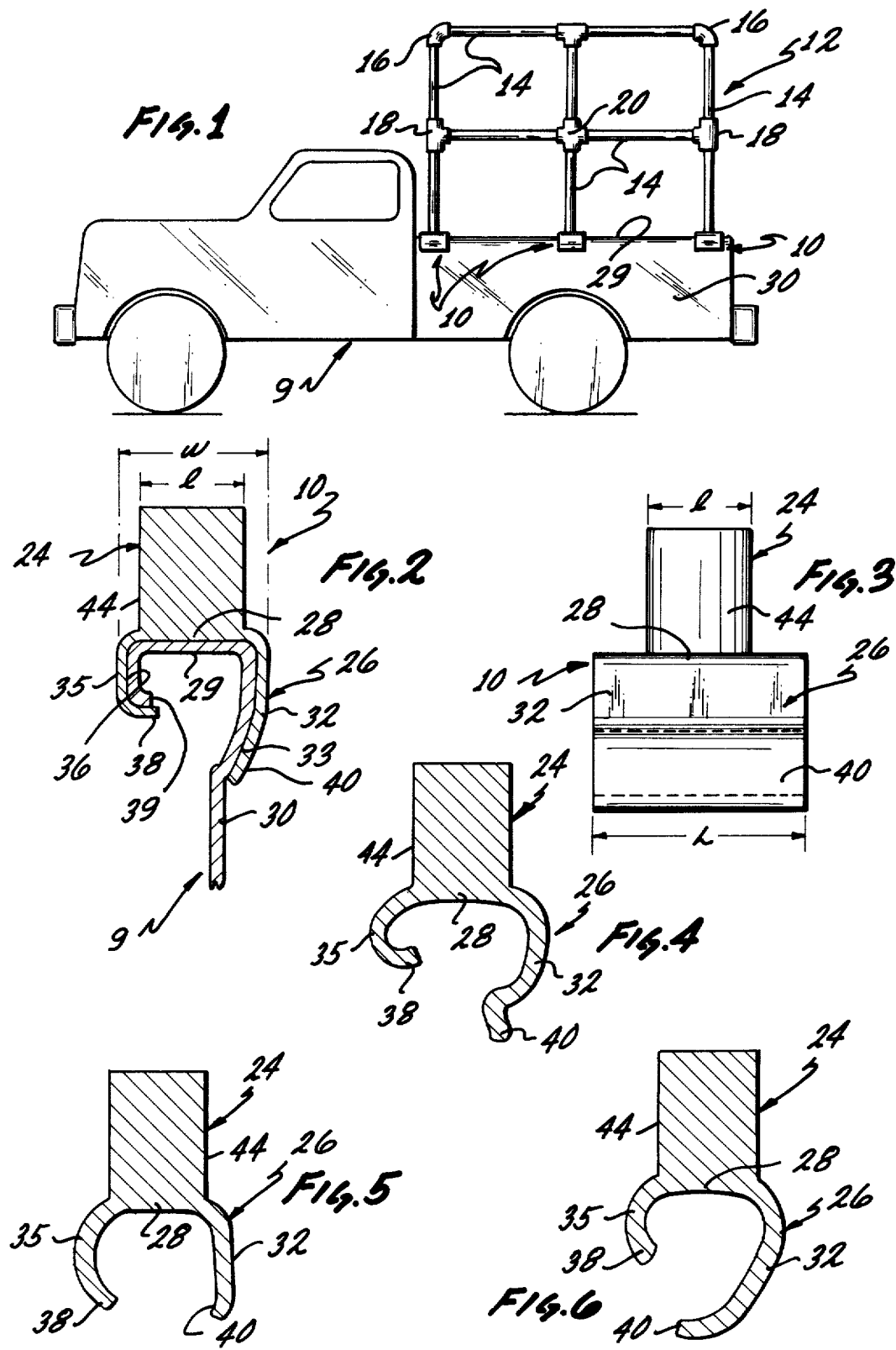

PICKUP TRUCK BED SIDEWALL ADAPTOR FOR A STAKE-FRAME ASSEMBLY

BACKGROUND OF THE INVENTION

The invention relates to foreign pickup trucks and more specifically to a truck bed sidewall adaptor for a stake-frame assembly.

Presently there are hundreds of thousands of foreign pickup trucks in the United States and each of these has a truck bed that lacks any structure for attaching a stake-frame assembly thereto. In the conventional American made pickup trucks, there are built-in slots along the top of the bed sidewall into which a stake-frame may be removably inserted. The top of the sidewalls of the foreign pickup trucks have no slots in them.

It is an object of the invention to provide a novel pickup truck bed sidewall adaptor that will allow a stake-frame assembly to be attached thereto.

It is also an object of the invention to provide a novel pickup truck bed sidewall adaptor that is economical to manufacture and market.

It is an additional object of the invention to provide a novel pickup truck bed sidewall adaptor that is easy to install and remove.

It is a further object of the invention to provide a novel pickup truck bed sidewall adaptor that can be used with standard tubular plastic pipe to form a stake-frame assembly.

SUMMARY OF THE INVENTION

The novel pickup truck bed sidewall adaptor is preferably formed from a plastic or nylon material. The material should also be somewhat flexible so that the adaptor may be snapped on to the top sidewall of a pickup truck bed.

The novel sidewall adaptor is comprised of a coupling member and a telescoping member. The coupling member has a top wall portion that in its operational position matingly rests on the horizontal top wall portion of a pickup truck bed sidewall. The top wall portion has a downwardly extending inside wall portion that matingly contacts the inside surface of the upper region of the pickup truck bed sidewall. The top wall portion also has a downwardly extending flange portion that matingly contacts the outside surface of a flange extending downwardly from the outer edge of the horizontal top wall portion of the pickup truck bed sidewall. The downwardly extending flange portion has an inwardly extending lip portion connected at its lower end that functions to grip the bottom edge of the downwardly extending outside flange of the pickup truck bed sidewall. The telescoping member is substantially vertically oriented and it extends upwardly from the top surface of the top wall portion.

The pickup truck bed sidewall adaptor is easily installed along the top of the pickup truck bed sidewalls. It is merely necessary to capture the outer lip portion of the coupling member beneath the outer downwardly extending flange portion of the side wall and then rotate the adaptor inwardly until its downwardly extending inside wall portion has snapped over the top area of the truck bed sidewall. The removal of the adaptor would be accomplished by reversing the above described proceedure. The resiliency of the downwardly extending flange portion and the downwardly extending inside wall portion of the adaptor allow it to be easily snapped into an outer position.

DESCRIPTION OF THE DRAWINGS

FIG. 1 is a side elevation view illustrating the novel side-wall adaptor installed on a pickup truck bed and having a stake-frame assembly secured thereto;

FIG. 2 is an end crossectional elevation view of the novel side-wall adaptor illustrating how it mates with the top portion of the truck bed sidewall;

FIG. 3 is a side elevation view of the novel sidewall adaptor;

FIG. 4 is an end cross sectional elevation view of a first alternative sidewall adaptor;

FIG. 5 is an end cross sectional elevation view of a second alternative novel sidewall adaptor; and FIG. 6 is an end cross sectional elevational view of a third alternative novel sidewall adaptor.

DESCRIPTION OF THE PREFERRED EMBODIMENT

The novel pickup truck bed sidewall adaptor will be described by referring to FIGS. 1-3. A foreign import pickup truck is generally designated numeral 10. It has a plurality of sidewall adaptors 10 detachably secured to the top of the bed sidewalls at spaced intervals. Mounted to the sidewall adaptors 10 is a stake-frame assembly 12.

The stake-frame assembly 12 is formed from a plurality of pipe section 14 that have been inner-connected by elbow couplings 16, T-couplings 18, and 4-way couplings 20. One of the preferred manners of forming such a stake-frame assembly is accomplished through the use of standard PVC pipe and couplings.

The sidewall adaptor is comprised of a telescoping member 24 and a sidewall coupling member 26.

The sidewall coupling member 26 has a top wall portion 28 that in its operational position matingly rests on the horizontal top wall portion 29 of the pickup truck bed sidewall 30. Top wall portion 28 has a downwardly extending inside wall portion 32 that matingly contacts the inside surface 33 of the upper region of pickup truck bed sidewall 30. Top wall portion 28 also has a downwardly extending flange portion 35 that matingly contacts the outside surface of a flange 36 extending downwardly from the outer edge of the horizontal top wall portion 29 of the pickup truck bed sidewall 30. Downwardly extending flange portion 35 has an inwardly extending lip portion 38 connected at its lower end that functions to grip the bottom edge 39 of the downwardly extending outside flange 36. Downwardly extending inside wall portion 32 and an inwardly extending lip portion 40 connected at its lower end that functions to grip the inside sidewall surface 33 of the pickup truck bed.

Telescoping member 24 extends upwardly from the top surface of top wall portion 28. Telescoping member 24 has a solid circular tubular wall 44.

The width of the telescoping member 24 is designated l which is its diameter. The width of the sidewall coupling member 26 is designated W. The length of sidewall coupling member 26 is designated L.

In FIGS. 4, 5, and 6, alternative sidewall adaptor structures are illustrated. In these Figures the like or similar structure elements are identified by the numbers of the structural elements to which they correspond in the sidewall adaptor illustrated in FIG. 2.

What is claimed is:

1. A pickup truck bed sidewall adapter for a stake-frame assembly comprising:

a pickup truck sidewall coupling member having a top wall portion that in its operational position matingly rests on the horizontal top wall portion of a pickup truck bed sidewall, said top wall portion having a downwardly extending inside wall portion that matingly contacts the inside surface of the upper region of a pickup truck bed sidewall, said top wall portion also having a downwardly extending flange portion that matingly contacts the outside surface of a flange extending downwardly from the outer edge of the horizontal top wall portion of a pickup truck bed sidewall, said downwardly extending flange having an inwardly extending lip portion connected to its lower end that functions to grip the bottom edge of the downwardly extending outside flange of a pickup truck bed sidewall; and a substantially vertically oriented telescoping member extending upwardly from the top surface of said top wall portion.

2. A pickup truck bed sidewall adaptor as recited in claim 1 wherein said downwardly extending inside wall portion has an inwardly extending lip portion connected at its lower end that functions to grip the inside sidewall surface of a pickup truck bed.

3. A pickup truck bed sidewall adaptor as recited in claim 1 wherein said telescoping member is tubular in shape.

4. A pickup truck bed sidewall adaptor as recited in claim 1 wherein the length of said pickup truck sidewall coupling member in greater than the corresponding length dimension of said telescoping member.

5. A pickup truck bed sidewall adaptor as recited in claim 4 wherein the width of said pickup truck sidewall coupling member is greater than the corresponding width dimension of said telescoping member.

6. A pickup truck bed sidewall adaptor as recited in claim 1 wherein said pickup truck sidewall coupling member and said telescoping member integrally formed.

7. A pickup truck bed sidewall adaptor as recited in claim 6 where said adaptor is made of plastic material.

8. A pickup truck bed sidewall adaptor as recited in claim 7 wherein said plastic material is flexible so that said adaptor may be snapped into the top sidewall of a pickup truck bed.

* * * * *